Dec. 10, 1940.   A. W. UNDERWOOD   2,224,279
PILING OR STACKING DEVICE
Filed Aug. 4, 1940

INVENTOR.
ALBERT WILLIAM UNDERWOOD.
BY
Zugelter and Zugelter
ATTORNEYS.

Patented Dec. 10, 1940

2,224,279

UNITED STATES PATENT OFFICE 2,224,279

PILING OR STACKING DEVICE

Albert William Underwood, Newport, Ky.

Application August 4, 1940, Serial No. 351,330

1 Claim. (Cl. 164—47)

This invention relates to a piling or stacking device particularly adapted for handling sheet metal, although it can be advantageously used to handle a variety of other materials which are cut into even lengths and widths preparatory to being piled and/or conveyed away.

Heretofore there has been no entirely satisfactory method, except by manual labor, for efficiently and evenly stacking sheets of metal and consequently such stacking operations have entailed a great loss of time, energy and expense. One of the primary objects of the present invention is to provide an automatic stacking device which may be secured to a standard shearing device from which trimmed sheets of material are automatically conveyed to the present device, where they are automatically and evenly stacked, both as to length and width.

Another object of the present invention is to provide a device having the hereinabove described characteristics, which includes means to permit quick and facile adjustment thereof whereby the device can accommodate different lengths of sheet material.

While it is true that other automatic stacking devices have been made and used, such devices have been mechanically and structurally complicated, and have been characterized by high initial and maintenance costs. The device of present invention is mechanically and structurally simple and may be manufactured and maintained at a minimum of cost.

These and other objects are attained by the means described herein and disclosed in the accompanying drawing which is semi-diagrammatical in order to clearly illustrate the structure without undue multiplicity of drawing.

At the outset, it should be clearly understood that while the stacking device of the present invention is shown and described as associated with the discharge side of a shearing press, such association is exemplary in nature, rather than restrictive. The instant device is intended for use in all those instances where it is desired to accurately align the vertical edges of each of a plurality of sheets of material stacked one upon another.

Figure 1:
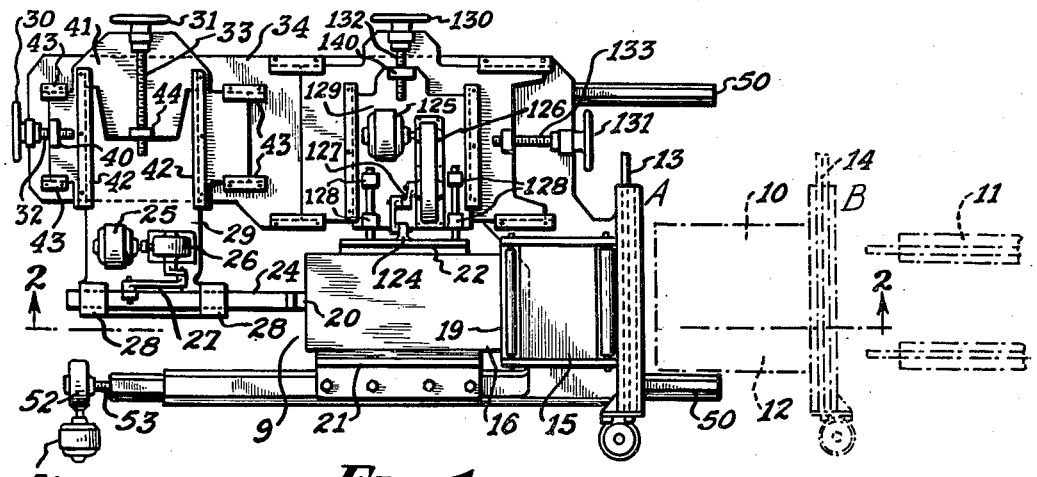
Fig. 1 is a top plan view of the device of the present invention.

With reference to Fig. 1, the stacking device of the present invention, denoted generally by the numeral 9, is disposed adjacent to the discharge side of a shearing machine 10. Sheets of material to be trimmed may be delivered to the shearing machine 10 via conveyor 11.

While the present invention is not directed to nor concerned with the structural details of the shearing machine 10, which is merely representative of any standard shearing or trimming device, the following brief description of its operating characteristics is presented for clarity of understanding. Sheet material from conveyor 11 is deposited onto a conventional table 12 disposed between the shear blades 13 and 14. The blades are then simultaneously actuated downwardly for trimming those edges of the sheet material which extend beyond or overhang anvils 113 and 114, Fig. 2. The trimmed sheets are then suitably removed from table 12 and deposited on discharge conveyor 15.

The stacking device of the present invention includes, broadly speaking, a platform or support 16 upon which the trimmed sheets from discharge conveyor 15 are deposited, and two pair of edge engaging members which accurately align the edges of each sheet with the corresponding edges of the lower sheets upon which it is stacked.

Figure 2:
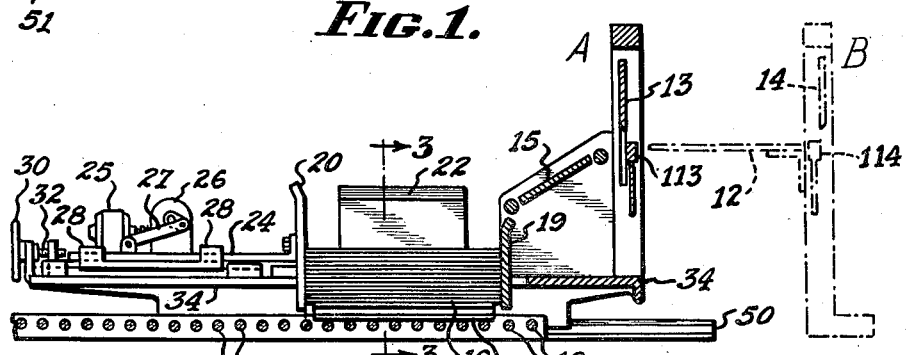
Fig. 2 is a section on the line 2—2 of Fig. 1.
Figure 3:
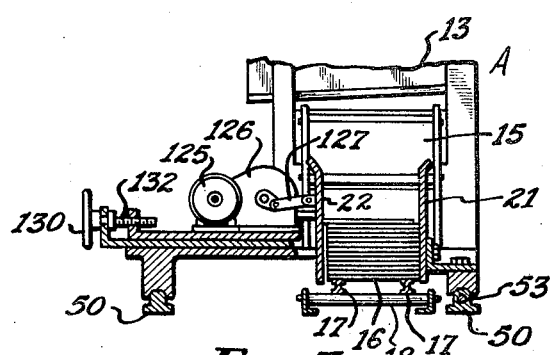
Fig. 3 is a section on the line 3—3 of Fig. 2.

As illustrated in Figs. 2 and 3, platform 16 may be supported upon a pair of structural elements 17 which in turn may be suitably supported upon a roller conveyor 18 or other means for permitting the removal of a fully loaded platform without disturbing or disaligning the sheets stacked thereon.

Each pair of edge engaging members comprises a fixed or stationary abutment such as 19 and 21, and a movable abutment or element such as 20 and 22. Each movable abutment is adapted to be moved or reciprocated toward and away from its respective fixed abutment.

Inasmuch as the structural details of each pair of edge engaging members are substantially identical, the characteristics of but one pair will be described, and the various parts of the second pair, which correspond to similar parts of the first pair, will be denoted by the same numerals raised, however, by one hundred. For example, motor 25 of the end-edge-engaging movable abutment element 20, corresponds to and operates in substantially the same manner as motor 125 of the side-edge-engaging movable abutment element 22, etc.

As disclosed in Figs. 1 and 2, movable abutment 20 may be secured to and carried by a sliding reciprocable element 24, which may be driven by motor 25 through speed reduction mechanism 26 and crank 27. Guide members, denoted generally by the numerals 28, may be provided for fixing the axis of reciprocation of element 24. Motor 25, mechanism 26 and guide members 28 may be suitably mounted to and supported by bed plate 29.

The overall lateral travel of movable abutment 20 is determined and fixed by the stroke of crank 27. When at the end of its forward stroke the movable abutment 20 should be spaced from its corresponding fixed abutment member 19 by a dimension substantially equal to the overall length of the sheets of material stacked upon platform 16. The sheets to be stacked are preferably discharged onto platform 16 during that period in the cycle of reciprocation of abutment 20 when said abutment is at or near the rearward end of its stroke.

In order to obtain maximum flexibility and utility of the device, means may be provided for permitting the movable abutment 20 to be adjusted relative to its fixed abutment 19, to accommodate sheets of varying lengths and widths. Such adjustment means may comprise mechanisms for bodily shifting bed plate 29, not only parallel to the axis of reciprocation of element 24, but also at right angles thereto.

Movement of the bed plate 29 parallel to the axis of reciprocation of abutment 20, may be obtained by rotation of hand wheel 30 to actuate screw 32, which is operatively associated with member 40. Hand wheel 30 is fixed relative to framework 34, whereas member 40 is fixed relative to plate 41 to which bed plate 29 is slidably mounted by means of guideways 42. Plate 41 is slidably mounted relative to framework 34 by means of guideways 43, as shown.

Movement of bed plate 29 at right angles to its axis of reciprocation of abutment 20 may be obtained by rotation of hand wheel 31 which drives screw 33 relative to member 44, which is fixed relative to bed 29.

In order to condition the stacking device for operation, each of the movable abutments 20 and 22 are adjusted so as to contact, when at the forward end of a stroke, one edge of a sheet of material disposed upon platform 16, when the opposite edge of the sheet is in contact with a corresponding and opposed fixed abutment. Each of the movable abutments should, preferably, contact the edge of a sheet midway of the length of an edge, as illustrated in Fig. 1.

The operating cycles of the movable abutments 20 and 22 are preferably synchronized so as to simultaneously contact their respective edges of each sheet after it has been discharged from conveyor 15 onto platform 16.

In order to facilitate the discharge of sheets of material onto platform 16, the upper edges of abutments 19, 20, 21 and 22 may be inclined outwardly as disclosed in Figs. 2 and 3.

If desired, the stacking or piling device may be suitably mounted on tracks 50, over which it may be propelled by means of motor 51, through speed reduction mechanism 52 and screw 53, as illustrated in Figs. 1 and 3. Such construction permits framework 34 to be secured relative to the left or shiftable element A of the shearing device, which as illustrated in Figs. 1 and 3, may also be suitably mounted on tracks 50. Element A is adapted to be moved away from or toward the right, or stationary shear element B for increasing or decreasing the width of cut, as is common practice.

By connecting the piling device to shear element A as shown, it is operatively associated with the discharge side of the shearing mechanism for any and all settings of elements A and B. This eliminates the old practice of separately adjusting the piling device for each setting of elements A and B.

It should be noted, in conclusion, that in those instances where it becomes desirable to align but one pair of edges of the articles deposited upon support 16, viz., either the side or end edges, the piling mechanism not needed may be rendered inoperative by disconnecting its particular drive motor from the electrical circuit.

From the foregoing, it is apparent that I have provided a highly efficient, adjustable mechanically and structurally, simple piling or stacking device adapted to be operably associated with the movable element of a shearing device.

It is to be understood that various modifications and changes in the structural details of the device may be made, within the scope of the appended claim, without departing from the spirit of the invention.

What is claimed is:

In a device of the class described, the combination which comprises a shearing device having a fixed and a movable shear standard, a piling device including a support upon which sheets of material discharged from said shearing device are deposited one upon another, a common track upon which the piling device and movable standard of the shearing device are mounted, means for interconnecting said piling device to the movable standard of the shearing device whereby they are movable as a unit, and means for propelling said piling device and its associated movable shearing standard along said tracks.

ALBERT WILLIAM UNDERWOOD.